US010929962B2

(12) United States Patent
Fleizach et al.

(10) Patent No.: US 10,929,962 B2
(45) Date of Patent: Feb. 23, 2021

(54) IMPOSING A PRIORI KNOWLEDGE TO ESTIMATE TURBULENCE

(71) Applicants: Gregory K. Fleizach, San Diego, CA (US); Kevin D. Casey, Cape May Point, NJ (US)

(72) Inventors: Gregory K. Fleizach, San Diego, CA (US); Kevin D. Casey, Cape May Point, NJ (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 146 days.

(21) Appl. No.: 16/446,476

(22) Filed: Jun. 19, 2019

(65) Prior Publication Data

US 2020/0402213 A1    Dec. 24, 2020

(51) Int. Cl.
| | | |
|---|---|---|
| G06K 9/00 | (2006.01) | |
| G06T 5/00 | (2006.01) | |
| H04N 5/232 | (2006.01) | |

(52) U.S. Cl.
CPC ......... *G06T 5/003* (2013.01); *H04N 5/23296* (2013.01); *G06T 2200/24* (2013.01); *G06T 2207/20061* (2013.01); *G06T 2207/20201* (2013.01)

(58) Field of Classification Search
CPC ............... G06T 5/003; G06T 2200/24; G06T 2207/20061; G06T 2207/20201; H04N 5/23296

(Continued)

(56) References Cited

U.S. PATENT DOCUMENTS

| 4,688,086 A | 8/1987 | Hutchin |
|---|---|---|
| 7,245,742 B2 | 7/2007 | Carrano |

(Continued)

FOREIGN PATENT DOCUMENTS

WO    WO 2011122951 A1    10/2011

OTHER PUBLICATIONS

Narasimhan, Srinivasa G., and Shree K. Nayar. "Interactive (de) weathering of an image using physical models." IEEE Workshop on color and photometric Methods in computer Vision. vol. 6. No. 6.4. France, 2003. (Year: 2003).*

(Continued)

*Primary Examiner* — Jonathan S Lee
(74) *Attorney, Agent, or Firm* — Naval Information Warfare Center, Pacific; Kyle Eppele

(57) ABSTRACT

Imposing a priori knowledge to estimate turbulence. The method includes receiving, at a memory, an original input image from an imaging instrument having an imaging wavelength and an optical aperture; and receiving, via a user input device and a graphical user interface, input of two or more points configured to substantially represent at least one feature. A processor estimates an atmospheric correlation length based on the received input of the two or more points, the imaging wavelength, and a size of the optical aperture. The processor mitigates turbulence in the original input image; and calculates a strength of the at least one feature based on the received input of the two or more points; until the atmospheric correlation length is optimal. If the atmospheric correlation length is not optimal, repeating the mitigation and calculation steps. The method also includes generating a turbulence-mitigated image based on the optimal atmospheric correlation length.

20 Claims, 4 Drawing Sheets

(58) Field of Classification Search
USPC .......................................................... 382/276
See application file for complete search history.

(56) References Cited

U.S. PATENT DOCUMENTS

| | | | |
|---|---|---|---|
| 9,305,339 B2* | 4/2016 | Yang | .................... G06K 9/4661 |
| 2014/0105515 A1 | 4/2014 | Zhu | |
| 2014/0368715 A1 | 12/2014 | Shih | |
| 2015/0156463 A1 | 6/2015 | Humphrey | |
| 2015/0293140 A1 | 10/2015 | Barille | |

OTHER PUBLICATIONS

Wu, Fengxia, et al. "A new interactive enhanced method for image with poor visibility." MIPPR 2005: Image Analysis Techniques. vol. 6044. International Society for Optics and Photonics, 2005. (Year: 2005).*

Yang, Wenhan, et al. "Joint rain detection and removal via iterative region dependent multi-task learning." CoRR, abs/1609.07769 2.3 (2016). (Year: 2016).*

Yuan, Fei, and Hua Huang. "Image haze removal via reference retrieval and scene prior." IEEE Transactions on Image Processing 27.9 (2018): 4395-4409. (Year: 2018).*

C. Carrano, "Speckle imaging over horizontal path", Proc. SPIE, vol. 4825, p. 109 (2002).

O. von der Lune, "Estimating Fried's parameter from a time series of an arbitrary resolved object imaged . . . ", JOSA A, vol. 1, No. 5, May 1984, pp. 510-520.

* cited by examiner

IMPOSING A PRIORI KNOWLEDGE TO ESTIMATE TURBULENCE

STATEMENT OF GOVERNMENT INTEREST FEDERALLY-SPONSORED RESEARCH AND DEVELOPMENT

The United States Government has ownership rights in this invention. Licensing inquiries may be directed to Office of Research and Technical Applications, Naval Information Warfare Center, Pacific, Code 72120, San Diego, Calif., 92152; telephone (619) 553-5118; email: ssc_pac_t2@navy.mil. Reference Navy Case No. 104057.

BACKGROUND OF THE INVENTION

Field of Invention

This disclosure relates to image processing, and more particularly, to estimating and mitigating turbulence in images.

Description of Related Art

Challenges may be encountered with obtaining an accurate estimation of the r0 parameter, which is a measure of the amount of turbulence in an image or video. Accordingly, challenges may also be encountered with the restoration of turbulent imagery. However, the r0 value estimated will only be a true measure of the turbulence if there is no blurring from sensor motion or optical aberrations. Otherwise, the r0 estimate will account for these effects as well. In this case, the result will be enhanced imagery, but possibly imprecise r0 estimates.

Atmospheric turbulence may be caused by fluctuations in the index of refraction that cause phase errors that blur and shift the image. The errors occur all along the optical path from the object being imaged to the imaging sensor, so the phase errors are different at every object point. The visual effect is an overall image blur and relative image motion. These effects are typically worse for long horizontal or slant paths, and the effects often intensify with temperature. Turbulence mitigation (or "deturbulence") techniques attempt to resolve the blur and image motion induced by turbulence. As a result of these turbulence mitigation techniques, improvements in image resolution may be, e.g., twenty times greater.

The prior art includes systems and techniques for mitigating the turbulence in imagery, with varying effectiveness. However, these techniques have one disadvantage or another that make them difficult to use. A common approach is to attempt to mitigate the turbulence in recorded imagery. For example, the bispectral speckle imaging turbulence mitigation algorithm (or bispectrum algorithm) is very effective, but it requires manual tuning of the r0 parameter like a focus adjustment. The turbulence estimate is then the value that was manually determined to generate the best improvement in the imagery. Other systems attempt to measure the atmospheric turbulence automatically, but these approaches are overly complex and hard to implement in practical systems.

Another type of turbulence mitigation system uses deformable mirrors to change the physical optics instead of operating on the recorded imagery. These systems can be effective, but they are costly, complicated, and still have the problem of accurately measuring the turbulence parameters to inform the mirror adaptations. It is also possible to use stereo cameras to attempt to estimate and mitigate turbulence. The disadvantage of this approach is that it requires a hardware change for systems already in place, which is often not possible.

Still other turbulence mitigation approaches are active, which means they use lasers to transmit pulses and measure the reflections. This is opposed to the passive turbulence mitigation systems that do not emit energy, but simply operate on the recorded imagery. Active systems have the advantage of being able to directly estimate the turbulence, but these systems can be expensive and bulky. Additionally, there are many use cases where emitting laser energy is unacceptable, and instead a passive method is required.

Other iterative approaches to estimate r0 rely on metrics that may fail to identify the optimum result in certain scenarios. For example, if a number of r0 values are applied via the turbulence mitigation algorithm and then the sharpness is measured, it is sometimes the case that the image with the most sharpness is not the most visually appealing result. As is often the case with objective image quality metrics, the metric may not accurately identify the best result, especially across a wide range of scenes.

There is a need for a system and method that accurately estimate turbulence while not suffering from the drawbacks of the prior art.

BRIEF SUMMARY OF INVENTION

The present disclosure addresses the needs noted above by providing a system and method for imposing a priori knowledge to estimate turbulence. In accordance with one embodiment of the present disclosure, a method is provided for imposing a priori knowledge to estimate turbulence. The method comprises receiving, at a memory device, an original input image from an imaging instrument having an imaging wavelength and an optical aperture. The method also comprises receiving, via a user input device and a graphical user interface (GUI), input of two or more points configured to substantially represent at least one feature. The method further comprises estimating, by a processor, an atmospheric correlation length based on the received input of the two or more points, the imaging wavelength and a size of the optical aperture.

The method still further comprises mitigating, by the processor, turbulence in the original input image; and calculating, by the processor, a strength of the at least one feature based on the received input of the two or more points.

The method also comprises determining whether an atmospheric correlation length is optimal based on the calculated strength of the at least one feature. If the atmospheric correlation length is not optimal, the mitigating and calculating steps are repeated by the processor.

The method also includes generating, by the processor, a turbulence-mitigated image based on the optimal atmospheric correlation length.

These, as well as other objects, features and benefits will now become clear from a review of the following detailed description, the illustrative embodiments, and the accompanying drawings.

BRIEF DESCRIPTION OF DRAWINGS

The accompanying drawings, which are incorporated in and form a part of the specification, illustrate example embodiments and, together with the description, serve to explain the principles of the system and method for imposing a priori knowledge to estimate turbulence. In the drawings.

DETAILED DESCRIPTION OF THE INVENTION

The present method and system are designed to optimally estimate the turbulence of a scene to correct for atmospheric blurring, sensor motion, and optical aberrations.

The present method and system accurately estimate the r0 parameter, which is a measure of the amount of turbulence in an image/video, and the r0 parameter is an estimate of the restoration of turbulent imagery. mitigate the turbulence in the imagery. The proposed method and system accurately estimate the turbulence in recorded imagery by leveraging known or presumed information about the scene to manually identify features of interest. This approach is in contrast to fully automatic methods, which can fail in corner cases, and fully manual methods, which may be time-consuming and taxing to the user.

The turbulence parameter r0 is defined as the atmospheric correlation length. An image with turbulence, caused by local temperature gradients along the imaging path, displays blurring with a resolution of $\lambda/r0$, where $\lambda$ is the center wavelength of imaging. The center wavelength of imaging is the wavelength corresponding to the center of the imaged band. For example, if the imaged band is four hundred nanometers to seven hundred nanometers (400 nm-700 nm), the center wavelength would be five hundred fifty (550 nm). Thus, the resolution is degraded by a factor of D/r0, where D is the imaging sensor aperture. The parameter r0, or a similar parameter, is used by turbulence mitigation algorithms to control the strength of the mitigation. The value of r0 to use in the turbulence mitigation is directly proportional to the amount of turbulence along the imaging path.

Figure 1:
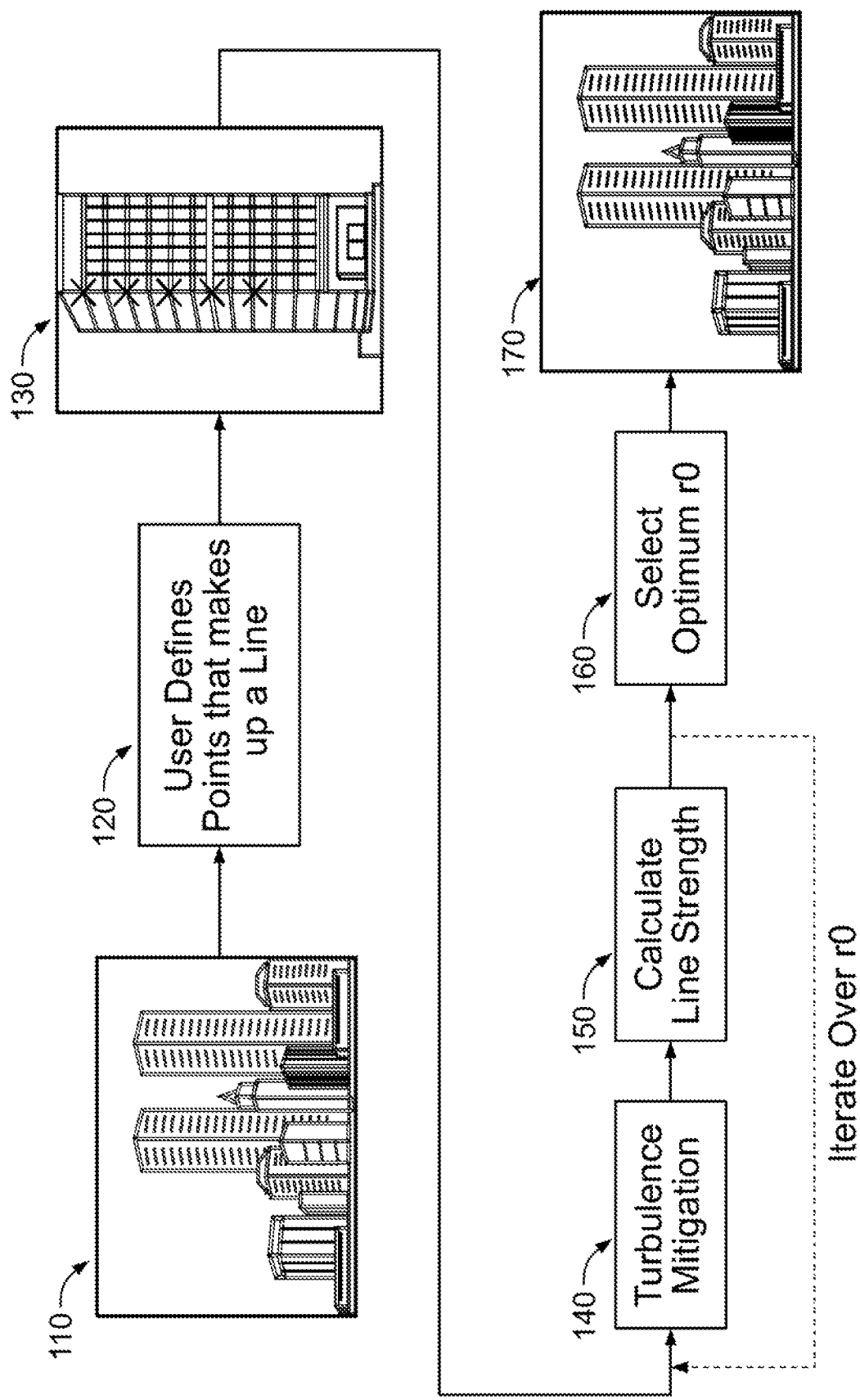
FIG. 1 illustrates a flow chart for a method for imposing a priori knowledge to estimate turbulence in accordance with one embodiment of the present disclosure.

Referring now to FIG. 1, a method for imposing a priori knowledge to estimate turbulence in accordance with one embodiment of the present disclosure is illustrated. At step 110, the system receives an original input image from an imaging instrument having an imaging wavelength and an optical aperture. The imaging instrument may also have a zoom feature that aids the user in identifying the feature by permitting the user to zoom in so that the user, via his/her eyesight, may discern features in the original input image. The original input image may include turbulence. The imaging instrument may be any type of digital camera. Imaging instruments may also include cameras for visible light, infrared cameras, hyperspectral imagers, etc. The proposed method and system are applicable to horizontal imaging (e.g. border surveillance) as well as vertical imaging (e.g. astronomy).

At step 120, an end user may manually identify points that make up a line or other feature that is identifiable or recognizable. The user may input these points using a user input device such as a mouse, stylus, keyboard (whereby coordinates are input), or other user input device. The input may also be accomplished using a graphical user interface, where user input of two or more points is configured to substantially represent the feature. This step is where the a priori knowledge of the user is imposed upon the r0 estimation process. That is, the user is instructing the algorithm that this set of points should make up, say, a straight line (or other identifiable or recognizable feature) in a turbulence-free image. The algorithm uses this information to obtain an accurate estimate of r0 and to mitigate the turbulence in the image. The user may also identify multiple lines in an image instead of a just a single line. Additional shapes such as circles, rectangles, triangles, etc. may also be used as distinguishing features as opposed to straight lines.

The minimum number of points the user may specify to indicate the straight line is two, since in the mathematical sense, two points are sufficient to define a line. However, the more points the user defines, the more data the algorithm has to use in its calculations, which may result in a better outcome. The user may input the points via a user input device, e.g., a mouse, stylus, touch screen or other user input device. The user input device may operate alone or it may operate in conjunction with a graphical user interface on which the user can select the desired points that make up the recognizable feature. An operational system of the proposed method and system might include a zoom feature to aid the user in finely selecting the points that make up a line. Additionally, the algorithm can leverage other available information, such as the line color if available, to account for any manual selection errors. In other words, to correct small user errors, the algorithm may search in a small neighborhood to make sure the data point matches the characteristics of the other data points. This kind of error-checking will enhance the robustness of the algorithm.

As mentioned above, in lieu of using a straight line as an identifiable or recognizable feature, additional shapes could be used as well. For example, identifying or recognizing the "L" of building corner or the "T" of a ship's mast or other feature would also be as effective, if not more. Other geometric shapes such as circles, rectangles, triangles, etc. could also be used. Furthermore, more than one shape could be identified at a time by the user. This would provide the algorithm more data from which to estimate the turbulence.

In addition to selecting a number of points that make up, comprise, or define a feature, it is possible to allow the user to trace the feature on the screen (or draw on a track pad). For example, the user may trace a circle around a vehicle's wheels or a trace letters/numbers on a sign in the image. The method in this approach would be similar that defined above, but in this case, the algorithm has many more points to work with. A slightly different implementation involves the user selecting the region in which the feature of interest is contained and the algorithm then determines what the salient feature is. For example, the user could select a building and let the algorithm find the lines to use for r0 estimation.

At step 130, the system receives the user input of points that make up a line or other feature on the original input image. In the present illustration, several x's are shown that are designed to make up a straight line. The next steps are to select an r0 value, apply a turbulence mitigation algorithm, calculate line strength, and then iterate over r0. The essence of this process is to apply a number of r0 values and determine how closely the user-identified points match a straight line. The spacing between the attempted r0 values could be linear, non-linear, non-uniform, or variable according to the line strength results. Instead of a brute force search across a range of r0 values, there may be alternative ways to speed up the search for the optimum r0 value (e.g., a coarse/fine search).

The r0 value that yields the strongest line is declared the optimal r0. The r0 search range should be appropriate for the imaging wavelength and optical aperture, as described above. To simplify this description, the search range may be considered to be a linear set of values across a reasonable range, to be searched sequentially.

Figure 2:
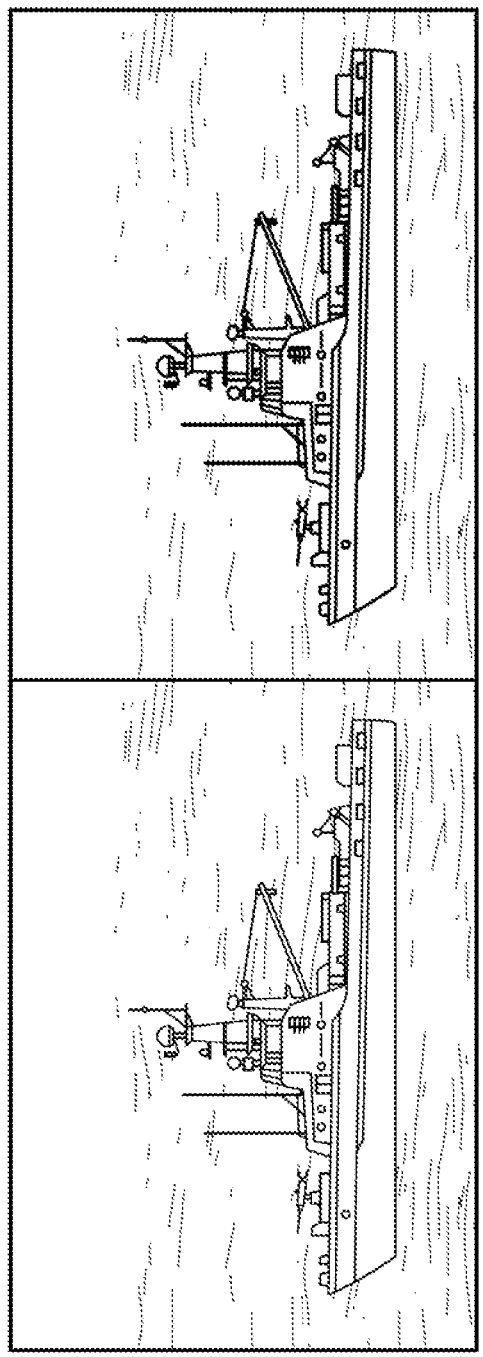
FIG. 2A is a turbulence-affected original image in accordance with one embodiment of the present disclosure.
FIG. 2B is an enhanced image for which turbulence has been reduced in accordance with one embodiment of the present disclosure.

The proposed method is insensitive to what type of turbulence mitigation is performed, including the particular turbulence mitigation algorithm or implementation used. The turbulence mitigation algorithm can be any of a variety of algorithms where r0 is involved in computing the function to compensate for atmospheric based blurring, including bispectrum processing. An example of a bispectrum result using a value of r0=11 mm is shown in FIG. 2. That is, this method works in conjunction with already implemented turbulence mitigation approaches, so the mitigation approach used can vary.

In this connection, at step 140, the system performs turbulence mitigation. It may do so by selecting an r0 value from a range of r0 values which may be appropriate for the imaging wavelength and optical aperture. For example, the imaging center wavelength might be five hundred fifty (550) nm, the imaging aperture ten centimeters (10 cm), and the range of r0 values to search one millimeter (1 mm) to twenty millimeters. The optimal r0 value for turbulence mitigation depends both on the strength of the turbulence (dependent on atmospheric conditions) and the sensor imperfections.

The output of the turbulence mitigation device or technique is then used to calculate the line strength of the user-identified or user-recognized line at step 150. It should be noted that, in the present illustration, the user has defined a line. However, other features could also be identified, e.g., a circle, triangle, rectangle, T-shape, L-shape, and the strength of those other features could also be calculated. A single metric, such as the root mean squared error (RMSE) of Euclidean distance from the user-defined points from the ideal shape could be used. That is, for a T-shape, the distance from each user-defined point on the "T" to the straight lines of the ideal perpendicular segments would be input to an RMSE equation. Note that an intermediate step between estimating the turbulence and calculating the user line strength may be to register the user-identified points back onto the line of interest. The turbulence mitigation algorithms attempt to correct for spatial variations, which results in shifts in the output image. The registration of the data points can be accomplished in the manner already described where the characteristics of the original data point (e.g. color, local structure, etc.) guide a local search to identify the shifted location of that point. The size of the local search area may be dictated by the value of r0 since a lower value indicates higher turbulence, which could mean larger spatial variance.

There are a number of ways to calculate the line strength. The approaches described above and below are simply used as examples.

At step 150, the line strength calculation can be done in a number of ways. One technique includes using a truncated Hough transform to determine the direction and length of the largest line strength.

Figure 3:
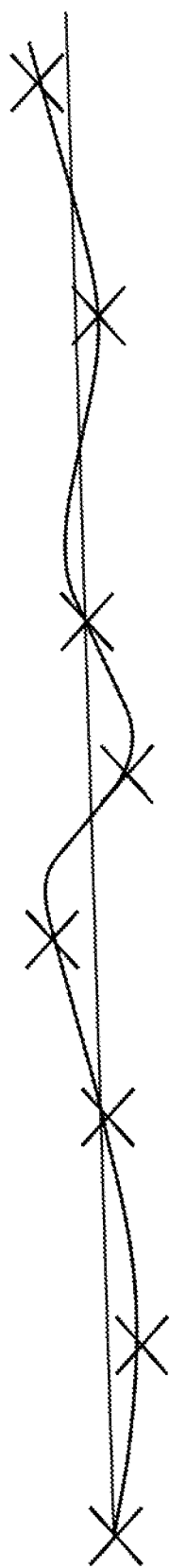
FIG. 3 illustrates a spatially variable black line, user-defined points and trend line that can be used with embodiments of the present disclosure.

Another technique for calculating line strength is to use a least-squares approach to calculate slope and offset of a trend line from the user-identified data points. An example is shown in FIG. 3, where the line of interest is in black, the user-defined points are x's and the trend line is in red. Then, the error from the data points to the trend line can be determined in, say, a root mean square error (RMSE) sense. That is, the perpendicular (i.e. Euclidean) distance from each point on the line of interest to the trend line is squared and then the square root of the sum of all the squared errors is calculated. Another approach is to detect the line identified by the user with an edge detection algorithm such as Sobel edge detection and measure the strength of this line. Instead of calculating the strength based on the user-identified points, those points are simply used to identify the actual line, from which the line strength is calculated. Again, a trend line can be defined and then the RMSE from the detected line to the trend line can be calculated. When the correct r0 value is tested, the turbulence mitigation output should yield a line that more closely matches the data points than the lines in the images produced by the other r0 values.

The line strength associated with each r0 value is then stored and the process is iterated over the range of r0 values. Then, at step 160, the r0 value that provides the lowest error (or conversely, the highest line strength) is selected as the optimal value. This r0 value can be used to automatically apply turbulence mitigation or it can be offered to the user as a button to update the enhancement with optimal parameters.

The present system and method offer the benefits of both fully automatic and fully manual r0 estimation methods without the drawbacks of either. That is, fully automatic methods that perform the brunt of the work generally work well can fail in corner cases (often when an enhanced image is needed the most) and fully manual methods that provide the best results are time-consuming and require a lot of effort on the part of the user. The proposed system and method requires only minimal user intervention to achieve the best result.

The present system and method are also applicable to a wide range of images because most images of targets of interest will contain at least one straight line segment. Cars, ships, buildings, and aircraft all contain lines that may be sufficient for use with this method.

The present system and method do not require any specialized hardware and can be used with existing sensors since it only operates on the recorded imagery.

The present system and method are conceptually simple and easy to implement in software. As a result, the computational burden is low and the algorithm can run in real-time or faster.

The present system and method are passive and do not require any active, energy-emitting components.

The present system and method can be applied to many regions of the image simultaneously to create different optimal r0's for different regions. For example, each feature that the user identifies and inputs into the system could be a part of a separate region. As a reminder, these features could include a line, T shape, an L shape, a circle, a rectangle or a triangle. If a user identifies six different features, then the present turbulence estimation technique could be applied to six different regions. In this manner, instead of a single r0 to mitigate either the foreground or background turbulence, this system and method can handle each region separately. This may be useful because the turbulence near hot surfaces is less pronounced as the distance to the surface is increased. For example, the turbulence witnessed just above an asphalt surface on a hot day is larger than the turbulence farther away.

The present system and method can be applied after imagery has been recorded, whereas turbulence estimation from deformable mirrors must occur at the time of collection. Similarly, the reflection data from active systems must be available to perform turbulence estimation in those systems, but the proposed system and method only require the recorded imagery.

Another new feature is that the present system and method optimize the image for the feature of interest. When compared to generally enhancing the image, this approach yields the best result for the user-identified feature. For example, if the ship in the foreground is what the user is interested in, then enhancing the image based on the background does not make sense. Instead, the present system and method would use the ship's features to enhance the ship.

Moreover, this system and method impose a priori information onto the r0 estimation process. An assumption of regular structure (not necessarily a line) is used to drive the turbulence mitigation enhancement.

The proposed r0 estimation process may be run automatically based on a timer or when a scene change is detected by tracking the user-identified/recognized feature. Otherwise, it may be manually activated.

The system and method does not necessarily need to be used to estimate atmospheric turbulence. It can be instead used to estimate the correction parameters for blurring from certain static or time-varying optical aberrations.

The algorithm used to perform turbulence mitigation does not have to be the bispectrum algorithm. For example, a simplified version of the bispectrum algorithm called speckle-lite, that only performs the speckle magnitude deconvolution one frame at a time, may be preferred since it is easier to calculate and sufficient to estimate r0 with this method. Additionally, a completely different turbulence mitigation algorithm can be used.

The present system and method may be used for turbulence detection in addition to or instead of turbulence estimation. It can be used to indicate whether the scene is turbulent, which may be independent of the turbulent estimation portion.

Figure 4:
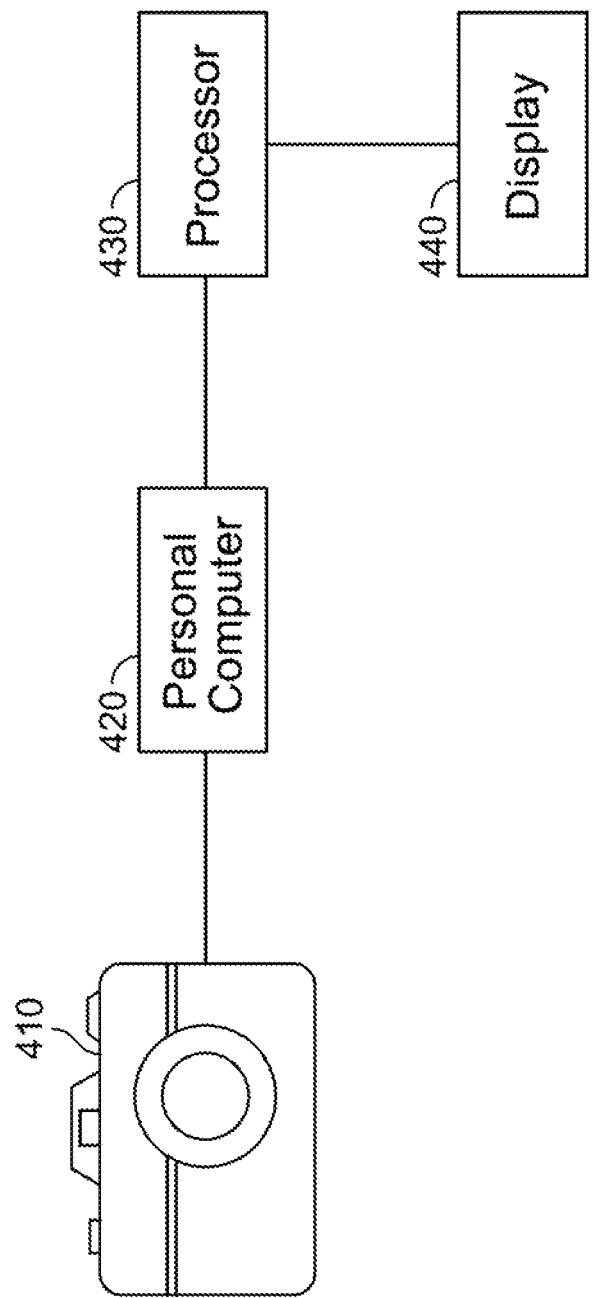
FIG. 4 is a system for imposing a priori knowledge to estimate turbulence in accordance with one embodiment of the present disclosure.

FIG. 4 is a system for imposing a priori knowledge to estimate turbulence in accordance with one embodiment of the present disclosure. The system 400 may include an imaging system 410, a personal computer 420 that is operably coupled to the imaging system 410, a processor 430 that is operably coupled to the imaging system 410 and a display 440 that is operably coupled to the imaging system 410. The imaging system 410 could be any digital imaging system. Digital imaging system 410 can connect to personal computer 420. The original input image may be fed from the imaging system 410 to the personal computer 420. The personal computer 420, which may include its own memory and processor, may feed the image to another processor 430 such as a graphics processing unit.

As an alternative to the system of FIG. 4, the personal computer 420 may be removed and the imaging system 410 and processor 430 can be connected immediately adjacent to each other. Some processing that was done by the personal computer 420 may be off-loaded to the imaging system 410 (which may include a processor) and/or the processor 430 shown in FIG. 4.

Software (not shown in FIG. 4) may be resident in the memory of personal computer 420, which may cause the processor 430 to perform one or more steps of the method for imposing a priori knowledge to estimate turbulence as set forth herein. If mechanical/electrical devices (whether existing as part of the imaging system or added thereafter) are used to further aid in in this process, such devices may be located within the body of imaging system 410 or elsewhere as can be appreciated by one of ordinary skill in the art.

The processor 430 may be configured to receive, at a memory device, an original input image from an imaging instrument having an imaging wavelength and an optical aperture. The processor 430 may also be configured to receive, via a user input device and a graphical user interface, input of two or more points configured to substantially represent at least one feature. The processor may be further configured to estimate an atmospheric correlation length based on the received input of the two or more points, the imaging wavelength and a size of the optical aperture. The processor 430 may still further be configured to mitigate turbulence in the original input image, calculate a strength of the at least one feature based on the received input of the two or more points, and determine whether an atmospheric correlation length is optimal based on the calculated strength of the at least one feature. If the atmospheric correlation length is not optimal, the processor 430 may be configured to continue the iterative process until an optimal r0 is reached. Thereafter, the processor 430 may be configured to generate a turbulence-mitigated image based on the optimal atmospheric correlation length.

Memory 420, as noted hereinabove, is sufficient to hold at least the input image and the turbulence-corrected output image of imaging system 410 Memory 420 may also include other elements such as processing steps or instructions related to imposing a priori knowledge to estimate turbulence. Examples of such processing steps are described in the flow chart of FIG. 1.

The speed of the processor 430 needed may depend on the application in which the processor 430 is used, as can be appreciated by one of ordinary skill in the art.

The foregoing description of various embodiments has been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the method and system be defined by the claims appended hereto.

What is claimed as new and desired to be protected by Letters Patent of the United States is:

1. A method, comprising:
   (a) receiving, at a memory device, an original input image from an imaging instrument having an imaging wavelength and an optical aperture;
   (b) receiving, via a user input device and a graphical user interface, input of two or more points configured to substantially represent at least one feature;
   (c) estimating, by a processor, an atmospheric correlation length based on the received input of the two or more points, the imaging wavelength and a size of the optical aperture;
   (d) mitigating, by the processor, turbulence in the original input image;
   (e) calculating, by the processor, a strength of the at least one feature based on the received input of the two or more points; and (f) determining whether an atmospheric correlation length is optimal based on the calculated strength of the at least one feature;
(g) if the atmospheric correlation length is not optimal, repeating, by the processor, steps d through f; and
(h) generating, by the processor, a turbulence-mitigated image based on the optimal atmospheric correlation length.

2. The method of claim 1, wherein the at least one feature is a line, and wherein the strength of the at least one feature is a line strength.

3. The method of claim 2, wherein the line strength is calculated using least-squares regression.

4. The method of claim 2, wherein the line strength is calculated using a truncated Hough transform.

5. The method of claim 2, wherein the step of mitigating turbulence includes using a bispectrum algorithm.

6. The method of claim 2, further comprising:
zooming, via the imaging instrument, to aid a user in identifying the at least one feature.

7. The method of claim 1, wherein the at least one feature is substantially a line, T shape, an L shape, a circle, a rectangle or a triangle.

8. The method of claim 1, wherein the receiving step includes receiving, via the user input device, input of two or more points configured to substantially represent multiple features.

9. A system for imposing a priori knowledge to estimate turbulence, the system comprising:
a memory configured to receive an original input image from an imaging instrument having an imaging wavelength and an optical aperture;
a processor configured to:
(a) receive, at a memory device, an original input image from an imaging instrument having an imaging wavelength and an optical aperture;
(b) receive, via a user input device and a graphical user interface, input of two or more points configured to substantially represent at least one feature;
(c) estimate an atmospheric correlation length based on the received input of the two or more points, the imaging wavelength and a size of the optical aperture;
(d) mitigate turbulence in the original input image;
(e) calculate a strength of the at least one feature based on the received input of the two or more points;
(f) determine whether an atmospheric correlation length is optimal based on the calculated strength of the at least one feature;
(g) if the atmospheric correlation length is not optimal, repeat steps d through f;
(h) generate a turbulence-mitigated image based on the optimal atmospheric correlation length.

10. The system of claim 9, wherein the at least one feature is a line, and wherein the strength of the at least one feature is a line strength.

11. The system of claim 10, wherein the processor is configured to calculate line strength using least-squares regression.

12. The system of claim 10, wherein the processor is configured to calculated line strength using a truncated Hough transform.

13. The system of claim 10, wherein the processor is configured to mitigate turbulence using a bispectrum algorithm.

14. The system of claim 10, further comprising:
a zooming mechanism configured to aid a user in identifying the at least one feature.

15. The system of claim 9, wherein the at least one feature is substantially a line, T shape, an L shape, a circle, a rectangle or a triangle.

16. The system of claim 9, wherein the processor is further configured to receive, via the user input device, input of two or more points configured to substantially represent multiple features.

17. A method, comprising:
(a) receiving, at a memory device, an original input image from an imaging instrument having an imaging wavelength and an optical aperture;
(b) receiving, via a user input device and a graphical user interface, input of two or more points configured to substantially represent at least one feature, wherein one of the at least one feature is a line;
(c) estimating, by a processor, an atmospheric correlation length based on the received input of the two or more points, the imaging wavelength and a size of the optical aperture;
(d) mitigating, by the processor, turbulence in the original input image;
(e) calculating, by the processor, a strength of the at least one feature based on the received input of the two or more points, wherein the strength of the at least one feature includes a line strength;
(f) determining whether an atmospheric correlation length is optimal based on the calculated strength of the at least one feature;
(g) if the atmospheric correlation length is not optimal, repeating, by the processor, steps d through f; and
(h) generating, by the processor, a turbulence-mitigated image based on the optimal atmospheric correlation length.

18. The method of claim 17, wherein the step of mitigating turbulence includes using a bispectrum algorithm.

19. The method of claim 17, further comprising:
zooming, via the imaging instrument, to aid a user in identifying the at least one feature.

20. The method of claim 17, wherein the at least one feature is substantially a line, T shape, an L shape, a circle, a rectangle or a triangle.

* * * * *